United States Patent Office 2,853,506
Patented Sept. 23, 1958

2,853,506
HALOALLYL XANTHATES

Marion W. Harman, Nitro, W. Va., assignor to Monsanto Chemical Company, St. Louis, Mo., a corporation of Delaware No Drawing. Application October 17, 1957
Serial No. 690,629

9 Claims. (Cl. 260—455)

The present invention relates to new compositions of matter of the broad chemical class most readily described as chloroalkenyl xanthates. More specifically, the invention is directed to compounds of the type

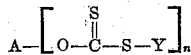

where A represents the residue of a mono or polyhydric alcohol from which the xanthate is formed. Thus A may represent non aromatic hydrocarbon, halogen substituted alkenyl and the residue of a dimethylol phenyl ether where the ether radical is Y. Y represents a halogen substituted allyl radical containing the halogen attached to unsaturated carbon and $n$ is an integer equal to the valence of A. These compounds are useful for destroying or retarding undesired vegetation, especially grasses. In addition, where A is non-aromatic hydrocarbon or halogen substituted alkenyl the compounds are useful adjuvants for the compounding of mineral lubricating oils. They are liquids readily soluble in mineral oil fractions and have the property of increasing the load carrying capacity of mineral lubricating oils.

The xanthate desired for reaction with the chloroalkene is produced in the ordinary manner by reacting in a jacketed vessel equipped with agitation an alcohol, carbon disulfide and an alkali such as caustic soda or potash. The reaction is carried out at room temperature and the product formed is dissolved in water. Should any water insoluble product be present, it is removed by filtration through paper, clay or by extraction with a solvent such as benzene.

The solution of the xanthate together with about 0.1% its weight of a suitable wetting agent, such as decyl benzene sodium sulfonate, is then placed in a jacketed container, through which jacket may be circulated suitable heating or cooling means as desired or required. The container is equipped with an agitator, a reflux condenser and suitable temperature recording means. Thereupon a quantity of chloroalkene substantially equivalent in amount to the weight of xanthate taken, is added as rapidly as possible and the mixture stirred for from 8 to 24 hours. If the temperature of the mass rises excessively it may be controlled by flowing water through the jacket. At the end of the reaction, the heavy oil product is extracted by solvent means, such as ether, chloroform, benzene or heptane, then the extract washed with water until neutral. The solvent is removed by heat, preferably under a vacuum of 4 to 10 mm. mercury and the residue heated to 95–100° C. The chloroalkenyl xanthates are oils, of a pale yellow to amber color, particularly after standing for a few hours. They are insoluble or only very slightly soluble in water and are very soluble in ether, acetone, alcohol, ethyl acetate, chloroform, heptane and benzene.

When condensing a chloroallyl chloride with a xanthate derived from a dimethylol phenol it is desirable to employ sufficient chloride to combine both with the phenolic group and the xanthate groups. Both react readily so that it is not feasible to esterify the xanthate without forming an ether from the phenol.

Proceeding as described above, a large number of halogen substituted alkenyl xanthates have been prepared and their properties studied. Typical examples of useful compounds within the scope of the invention are listed below:

2-chloroallyl ethylxanthate

C$_2$H$_5$OCS.SCH$_2$CCl=CH$_2$ 3-chloroallyl ethylxanthate

C$_2$H$_5$OCS.SCH$_2$CH=CHCl 2-chloroallyl isopropylxanthate (CH$_3$)$_2$CHOCS.SCH$_2$CCl=CH$_2$ 3-chloroallyl isopropylxanthate (CH$_3$)$_2$CHOCS.SCH$_2$CH=CHCl 2-chloroallyl pentylxanthate CH$_3$(CH$_2$)$_3$CH$_2$OCS.SCH$_2$CCl=CH$_2$ 3-chloroallyl pentylxanthate CH$_3$(CH$_2$)$_3$CH$_2$OCS.SCH$_2$CH=CHCl 2-chloroallyl sec-butylxanthate CH$_3$.CH$_2$ĊHOCS.SCH$_2$CCl=CH$_2$
 $\quad\quad\quad$ |
 $\quad$ CH$_3$ 3-chloroallyl sec-butylxanthate CH$_3$.CH$_2$ĊHOCS.SCH$_2$CH=CHCl
 $\quad\quad\quad$ |
 $\quad$ CH$_3$ Bis(2-chloroallyl)-2-butenylenedixanthate

2-chloroallyl (6,6-dimethyl bicyclo[3.1.1]-2-heptenyl)-ethyl xanthate

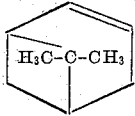

2-chloroallyl cyclohexylmethylxanthate

C$_6$H$_{11}$CH$_2$OCS.SCH$_2$CCl=CH$_2$ 2-chloroallyl allylxanthate

H$_2$C=CHCH$_2$OCS.SCH$_2$CCl=CH$_2$

Ethylenebis(2-chloroallylxanthate)

CH$_2$OCS.SCH$_2$CCl=CH$_2$
|
CH$_2$OCS.SCH$_2$CCl=CH$_2$ 2-chloroallyl-3-chloro-2-butenylxanthate CH$_3$CCl=CHCH$_2$OCS.SCH$_2$CCl=CH$_2$ 2,3-dichloroallyl-3-chloro-2-butenylxanthate CH$_3$CCl=CHCH$_2$OCS.SCH$_2$CCl=CHCl 2,3-dichloroallyl ethylxanthate C$_2$H$_5$OCS.SCH$_2$CCl=CHCl 2,3-dibromoallyl isopropylxanthate (CH$_3$)$_2$CHOCS.SCH$_2$CBr=CHBr 3-iodoallyl isopropylxanthate (CH$_3$)$_2$CHOCS.SCH$_2$CH=CHI 2-chloro-3-fluoroallyl isopropylxanthate (CH$_3$)$_2$CHOCS.SCH$_2$CCl=CHF 2-chloroallyl cyclohexylethylxanthate

Bis(2 - chloroallyl) - 2 - (2 - chloroallyloxy) - 5 - methyl-m-phenylenedimethylenedixanthate

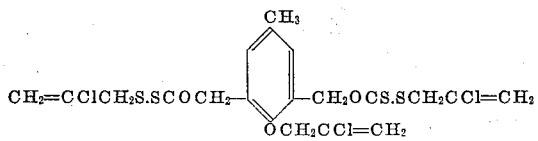

Useful properties as herbicides are illustrated by applying the haloalkenylxanthates in spray form to 10 to 14 day old specimens of a typical grass and broadleaf plant and observing the phytotoxicity. The phytotoxicity was recorded according to the following key:

RATING KEY FOR PHYTOTOXICITY

| | |
|---|---|
| No phytotoxicity | 0 |
| Slight phytotoxicity | 1 |
| Moderate phytotoxicity | 2 |
| Severe phytotoxicity | 3 |
| Dead | 4 |
| Defoliation | B |

Typical results are recorded below:

*Table I*

| Haloalkenylxanthate | Conc., Percent | Phytotoxicity | |
|---|---|---|---|
| | | Corn | Bean |
| 3-Chloro-2-butenyl ethylxanthate | 1.0 | 0 | 0 |
| | 0.2 | 0 | 0 |
| 2-Chloroallyl ethylxanthate | 1.0 | 4 | 1 |
| | 0.3 | 3 | 0 |
| 3-Chloroallyl ethylxanthate | 1.0 | 4 | 1 |
| | 0.3 | 1 | 0 |
| 2-Chloroallyl 2-(6,6-dimethyl bicyclo[3.1.1]-2-hepten-2-yl)-ethylxanthate | 0.5 | 3 | 0 |
| | 0.2 | 1 | ------ |
| 2-Chloroallyl isopropylxanthate | 0.5 | 3+ | 1 |
| 3-Chloroallyl isopropylxanthate | 0.5 | 3+ | 1 |
| 2-Chloroallyl pentylxanthate | 0.5 | 3+ | 2 |

The results for 3-chloro-2-butenyl ethylxanthate show the necessity for a halogen substituted allyl group to secure herbicidal properties. The specificity was further illustrated by the fact that 3-chloro-2-butenyl-2-(6,6-dimethyl bicyclo[3.1.1]-2-heptenyl)ethylxanthate was also devoid of herbicidal activity. In general, increasing the size of the halogen substituted alkenyl group to more than three carbon atoms destroyed the herbicidal properties. In pre-emergence application at 25#/acre 3-chloroallyl pentylxanthate was severely toxic to wild oat and buckwheat and moderately toxic to brome grass, rye grass, mustard and sugar beet.

For the compounding of mineral oils the new compounds are preferably incorporated in amounts of 1 to 10%. In most cases the compounds are completely miscible in all proportions and mineral oil concentrates may be prepared.

It is intended to cover all changes and modifications of the examples of the invention herein chosen for purposes of disclosure which do not constitute departures from the spirit and scope of the invention.

This application is a continuation-in-part of application Serial No. 516,050, filed June 16, 1955, and now abandoned.

What is claimed is:

1. A halogen substituted alkenyl xanthate of the general formula

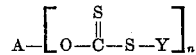

where A represents a member of the group consisting of non-aromatic hydrocarbon, halogen substituted alkenyl and the residue of a dimethylol phenylether where the ether radical is Y, Y representing a halogen substituted allyl radical containing halogen attached to unsaturated carbon and *n* is an integer equal to the valence of A.

2. A halogen substituted alkenyl xanthate of the general formula

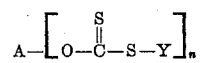

where A represents a non-aromatic hydrocarbon radical, Y represents a halogen substituted allyl radical in which the halogen is attached to unsaturated carbon and *n* is an integer equal to the valence of A.

3. A halogen substituted alkenyl xanthate of the general formula

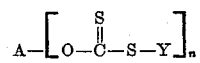

where A represents an acyclic hydrocarbon radical and Y represents an allyl group containing at least one chlorine atom, the chlorine being linked to unsaturated carbon, and *n* is an integer equal to the valence of A.

4. An S monochloroallyl lower alkylxanthate.
5. 3-chloroallyl ethylxanthate.
6. 2-chloroallyl ethylxanthate.
7. 2-chloroallyl isopropylxanthate.
8. A halogen substituted alkenyl xanthate of the general formula

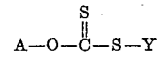

where A represents a halogen substituted alkenyl radical and Y represents a halogen substituted alkenyl radical, the halogen being attached to unsaturated carbon.

9. A halogen substituted alkenyl xanthate of the general formula

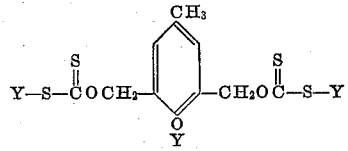

where Y represents a halogen substituted allyl radical, the halogen being attached to unsaturated carbon.

No references cited.